(12) United States Patent
Misumi et al.

(10) Patent No.: US 12,392,077 B2
(45) Date of Patent: Aug. 19, 2025

(54) FILTER MEMBER AND WASHING MACHINE

(71) Applicant: SHARP KABUSHIKI KAISHA, Sakai (JP)

(72) Inventors: Masaru Misumi, Sakai (JP); Yui Kumon, Sakai (JP); Kohei Yamauchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 203 days.

(21) Appl. No.: 18/205,691

(22) Filed: Jun. 5, 2023

(65) Prior Publication Data

US 2023/0407547 A1  Dec. 21, 2023

(30) Foreign Application Priority Data

Jun. 21, 2022 (JP) .................. 2022-099756

(51) Int. Cl.
*D06F 39/10* (2006.01)
*B01D 29/44* (2006.01)
*D06F 103/42* (2020.01)
*D06F 105/34* (2020.01)

(52) U.S. Cl.
CPC ............. *D06F 39/10* (2013.01); *B01D 29/44* (2013.01); *D06F 2103/42* (2020.02); *D06F 2105/34* (2020.02)

(58) Field of Classification Search
CPC .. D06F 39/10; D06F 2103/42; D06F 2105/34; B01D 29/44; B01D 2201/306
See application file for complete search history.

(56) References Cited

U.S. PATENT DOCUMENTS

| | | | |
|---|---|---|---|
| 6,200,467 B1 | 3/2001 | Nagaoka | |
| 2003/0209041 A1* | 11/2003 | Thies | D06F 39/10 68/16 |
| 2005/0120758 A1* | 6/2005 | Thies | D06F 39/10 68/18 R |
| 2005/0246843 A1* | 11/2005 | Song | D06F 39/10 68/3 R |
| 2012/0125056 A1* | 5/2012 | Bondi | D06F 39/086 68/18 F |
| 2012/0186306 A1* | 7/2012 | Kim | D06F 39/10 68/18 F |
| 2014/0083145 A1* | 3/2014 | Bondi | D06F 39/10 68/18 F |
| 2020/0208332 A1* | 7/2020 | Curiel | D06F 21/02 |
| 2020/0215468 A1* | 7/2020 | Paig-Tran | B01D 35/26 |

FOREIGN PATENT DOCUMENTS

| | | |
|---|---|---|
| CN | 106319879 A | 1/2017 |
| EP | 1167613 A2 | 1/2002 |
| EP | 3736032 A1 | 11/2020 |
| JP | 2004-208712 A | 7/2004 |
| JP | 2015-054107 A | 3/2015 |
| JP | 6626772 B2 | 12/2019 |
| JP | 2021-177982 A | 11/2021 |

* cited by examiner

*Primary Examiner* — Joseph L. Perrin
(74) *Attorney, Agent, or Firm* — ScienBiziP, P.C.

(57) ABSTRACT

A filter member is detachably mounted in a filter case formed with an inflow port through which washing water flows in and an outflow port through which the washing water flows out. The filter member includes a rib-shaped portion partitioning through holes adjacent to each other. At least one of the through holes is inclined from an inner peripheral surface of the filter member.

11 Claims, 13 Drawing Sheets

FILTER MEMBER AND WASHING MACHINE

CROSS-REFERENCE TO RELATED APPLICATIONS

This application claims the benefit of priority to Japanese Patent Application Number 2022-099756 filed on Jun. 21, 2022. The entire contents of the above-identified application are hereby incorporated by reference.

BACKGROUND

Technical Field

The disclosure relates to a filter member and a washing machine including the filter member.

In recent years, attention has been focused on technologies that mimic and utilize various functions of organisms, so-called biomimetics. Nature technology (trademark) is known as an example of manufacturing that employs such a biomimetic technology in electrical products and the like.

Some washing machines include a filter member for capturing lint or the like contained in washing water (see, for example, JP 2015-54107 A). The filter member is detachably provided in a case member (filter case) into which washing water flowing out from a bottom portion of a washing tub flows. The filter member is provided with a plurality of rectangular through holes to capture lint or the like in washing water.

SUMMARY

However, in the related art as described above, it is not necessarily easy to collect captured lint or the like.

An object of an aspect of the disclosure is to achieve a filter member and a washing machine capable of easily collecting captured lint or the like.

To solve the above-described problem, a filter member according to an aspect of the disclosure is a filter member detachably mounted in a filter case formed with an inflow port through which water flows in and an outflow port through which the water flows out, the filter member including a rib-shaped portion configured to partition through holes adjacent to each other, wherein each of the through holes is inclined from an inner peripheral surface of the filter member.

In order to solve the above problem, a washing machine according to another aspect of the disclosure includes the above-described filter member.

According to an aspect of the disclosure, it is possible to achieve a filter member and a washing machine capable of easily collecting captured lint or the like.

BRIEF DESCRIPTION OF DRAWINGS

The disclosure will be described with reference to the accompanying drawings, wherein like numbers reference like elements.

DESCRIPTION OF EMBODIMENTS

Embodiment

An embodiment of the disclosure will be described in detail below.

Summary of Washing Machine

Figure 1:
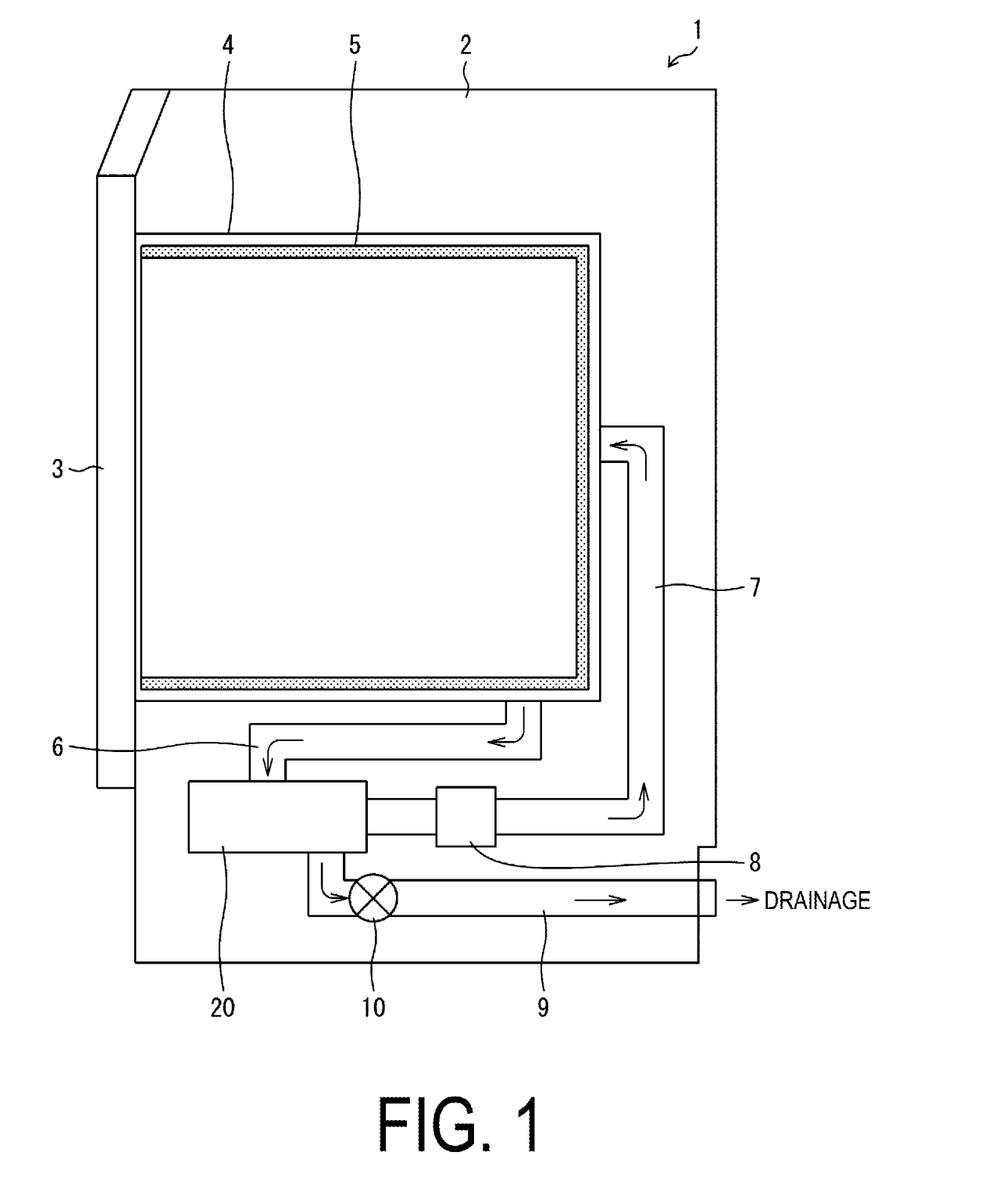
FIG. 1 is a schematic view illustrating configurations of main parts of a washing machine according to a present embodiment.

FIG. 1 is a schematic view illustrating configurations of main parts of a washing machine 1 according to the present embodiment. As illustrated in FIG. 1, the washing machine 1 includes a main body 2 and a door 3. The main body 2 includes a washing tub 4 therein, and a rotary drum 5 is rotatably provided in the washing tub 4. The washing tub 4 is open at a portion proximate to the front surface of the main body 2, and when the door 3 is closed, the inside thereof is liquid-tightly sealed.

The washing tub 4 is connected to a filter device 20 via a first pipe 6 and a second pipe 7. A circulation pump 8 is provided in the middle of the second pipe 7. The first pipe 6, the second pipe 7, the filter device 20, and the circulation pump 8 constitute a circulation path for washing water (water).

A third pipe 9 for water drain is further connected to the filter device 20. An electromagnetic valve 10 is provided in the middle of the third pipe 9. In FIG. 1, the second pipe 7 is connected to the rear surface of the washing tub 4, but the connection position of the second pipe 7 to the washing tub 4 is not particularly limited.

At the time of washing, the electromagnetic valve 10 is closed and the circulation pump 8 is operated, so that the washing water is circulated. The washing water is sent from the washing tub 4 to the filter device 20 through the first pipe 6 and is returned from the filter device 20 to the washing tub 4 through the second pipe 7.

At the time of water drain, the circulation pump 8 is stopped and the electromagnetic valve 10 is opened, so that the washing water can be drained. The washing water is sent from the washing tub 4 to the filter device 20 through the first pipe 6 and is drained through the third pipe 9.

When the washing water passes through the filter device during both washing and water drain, lint or the like, which is a captured substance mixed in the washing water, is captured by the filter device 20.

Filter Device

Figure 2:
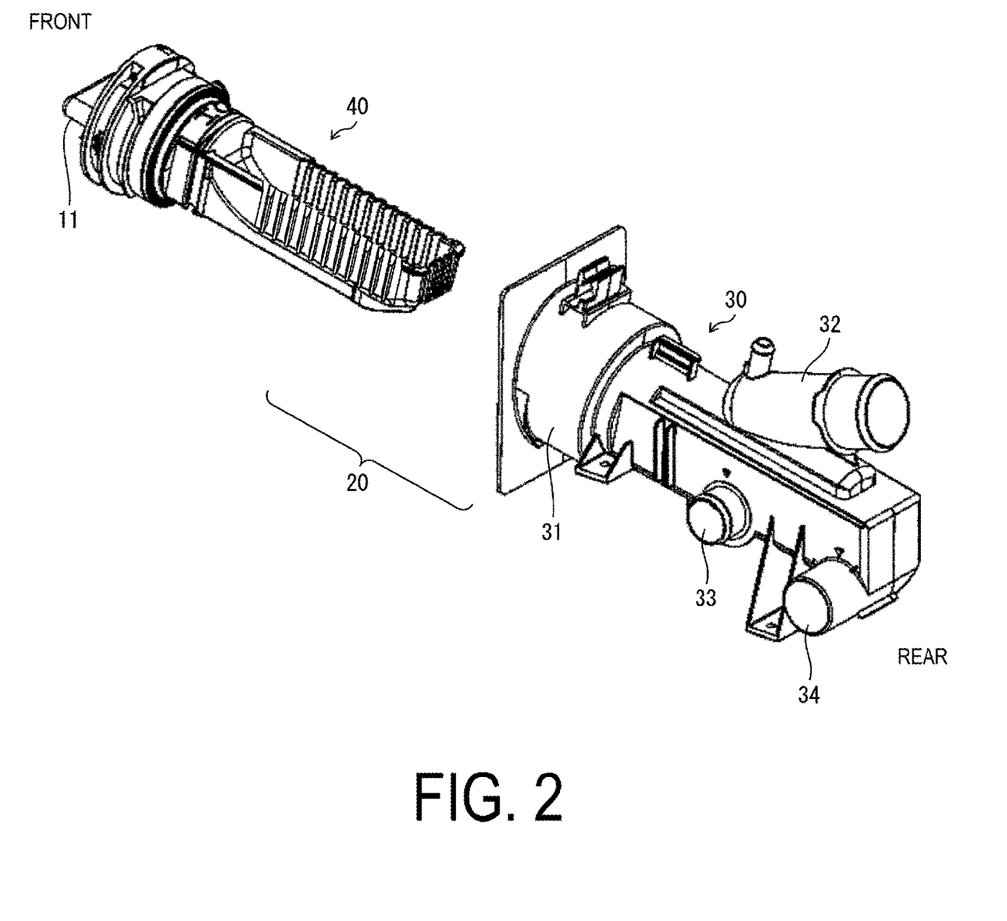
FIG. 2 is an exploded perspective view of a filter device included in the washing machine illustrated in FIG. 1 when viewed obliquely from above.
Figure 3:
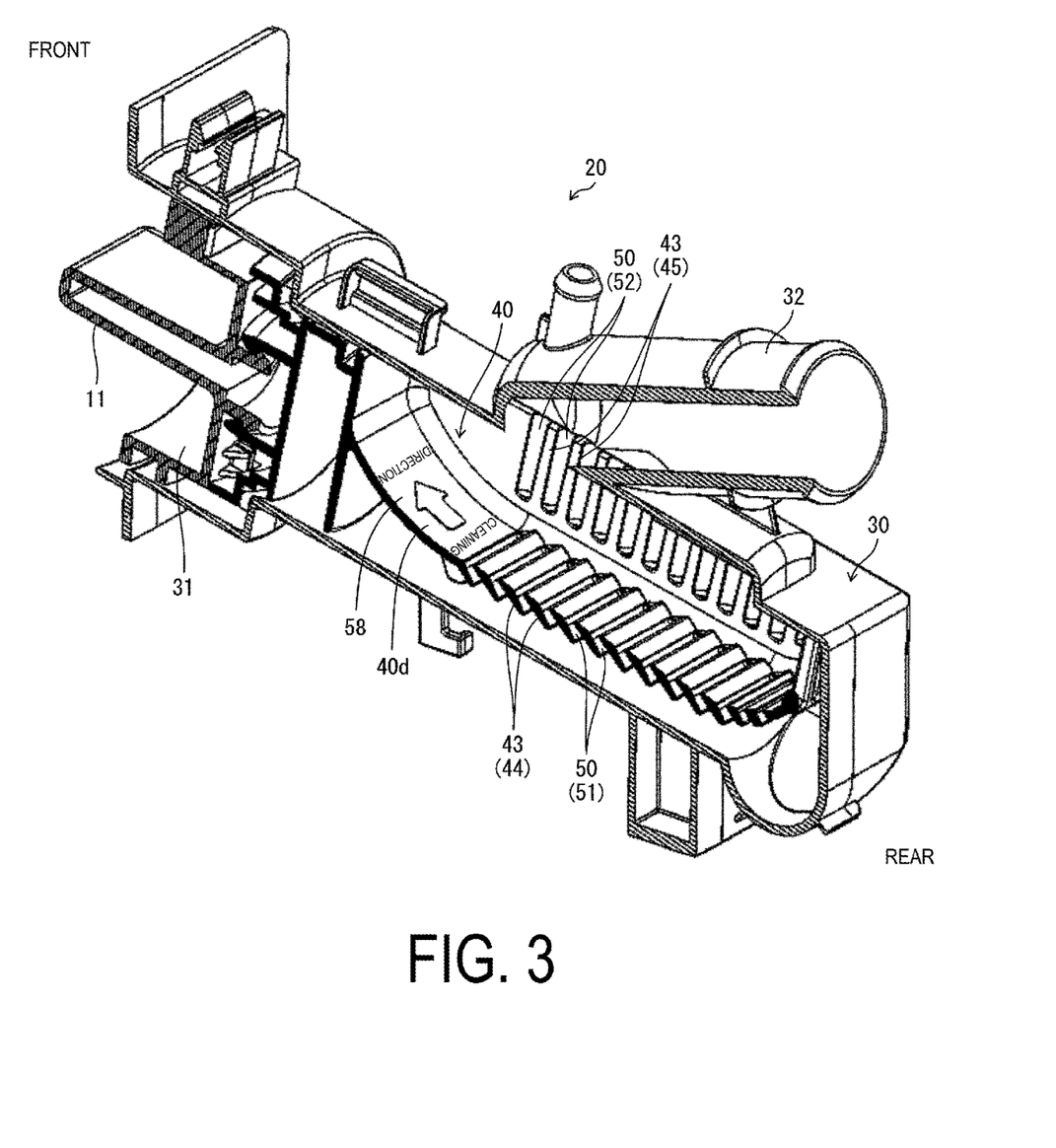
FIG. 3 is a perspective vertical cross-sectional view illustrating an internal configuration of the filter device illustrated in FIG. 2.

A configuration of the filter device 20 according to the present embodiment will be described. FIG. 2 is an exploded perspective view of the filter device 20 viewed obliquely from above. FIG. 3 is a perspective vertical cross-sectional view illustrating an internal configuration of the filter device 20. In the following description, the orientation of the filter device 20 will be indicated using the orientation in a state where the filter device 20 is disposed in the washing machine 1. That is, the front direction of the filter device 20 corresponds to the front surface direction of the washing machine 1, and the rear direction of the filter device 20 corresponds to the rear surface direction of the washing machine 1.

As illustrated in FIGS. 2 and 3, the filter device 20 includes a filter case 30 and a filter member 40 housed in the filter case 30. The filter case 30 is a tubular case member having a bottom and is configured to house the filter member 40 therein. The filter case 30 is fixedly supported at a front lower portion inside the main body 2 of the washing machine 1 (see FIG. 1). The filter case 30 is disposed inside the washing machine 1 such that the longitudinal axis of the tubular portion is oriented in the front-rear direction of the washing machine 1.

At the front of the filter case 30, an insertion port 31 for inserting the filter member 40 is provided. The filter member 40 is detachably mounted in the filter case 30 through the insertion port 31.

A knob member 11 is attached to a front end portion of the filter member 40. Although not illustrated, a male screw portion is formed at the knob member 11, and a female screw portion is formed at the insertion port 31 of the filter case 30. The knob member 11 is rotated in a state where the filter member 40 is inserted in the filter case 30, and thus the filter member 40 can be attached to and detached from the filter case 30.

An inflow port 32 through which washing water flows in and outflow ports 33 and 34 through which the washing water flows out are formed at the filter case 30. Specifically, the inflow port 32, and a first outflow port 33 and a second outflow port 34 serving as the outflow ports are formed on side surfaces of a tubular portion of the filter case 30. The inflow port 32 is provided on an upper surface of the filter case 30 and is connected to the above-described first pipe 6 (see FIG. 1). The first outflow port 33 and the second outflow port 34 are provided at lower portions of a side surface of the filter case 30. The first outflow port 33 is connected to the above-described second pipe 7 (see FIG. 1), and the second outflow port 34 is connected to the above-described third pipe 9 (see FIG. 1).

In the present embodiment, the inflow port 32 has a shape in which an upper portion thereof is inclined rearward in a side view. Thus, the washing water from the inflow port 32 obliquely flows in from the rear toward the front. Note that the inflow port 32 may be provided parallel to the up-down direction in a side view.

The filter member 40 is disposed in the filter case 30 so as to be positioned between the inflow port 32, and the first outflow port 33 and the second outflow port 34. Thus, the filter member 40 can perform a filter function on washing water flowing from the inflow port 32 to the first outflow port 33 during washing and can perform a filter function on washing water flowing from the inflow port 32 to the second outflow port 34 during water drain.

Filter Member

Figure 4:
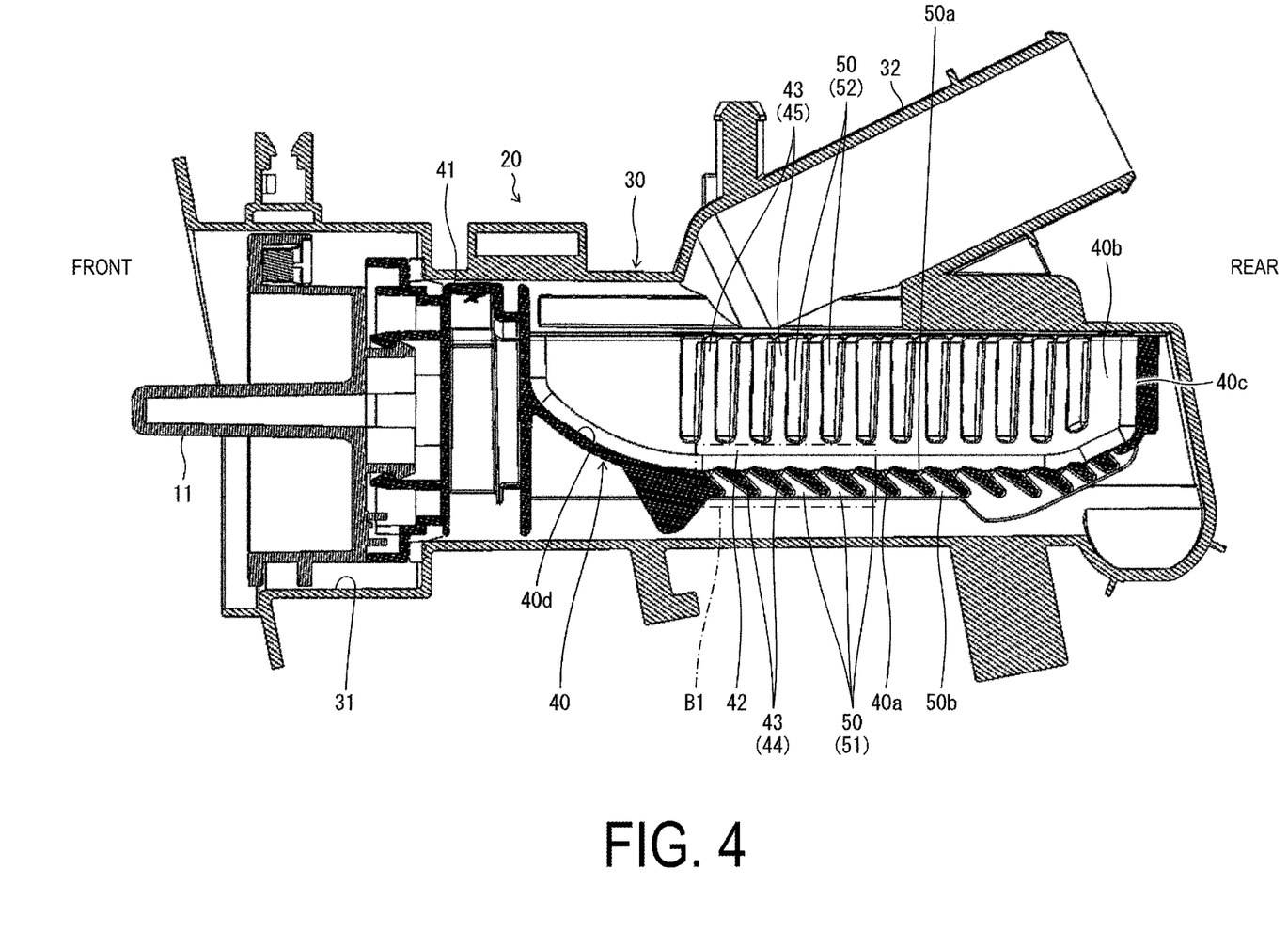
FIG. 4 is a vertical cross-sectional view illustrating the internal configuration of the filter device illustrated in FIG. 2.
Figure 5:
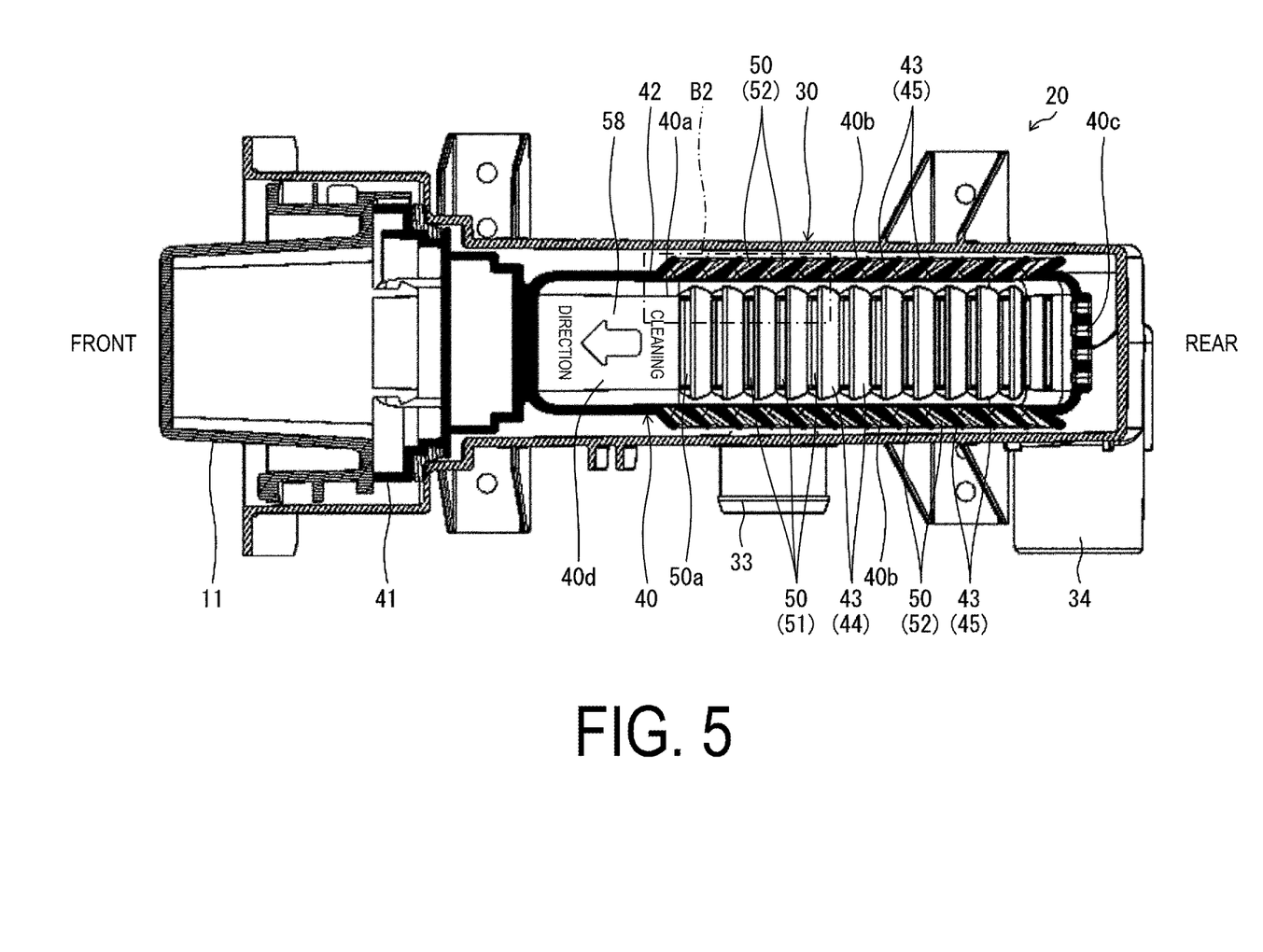
FIG. 5 is a transverse cross-sectional view illustrating the internal configuration of the filter device illustrated in FIG. 2.
Figure 6:
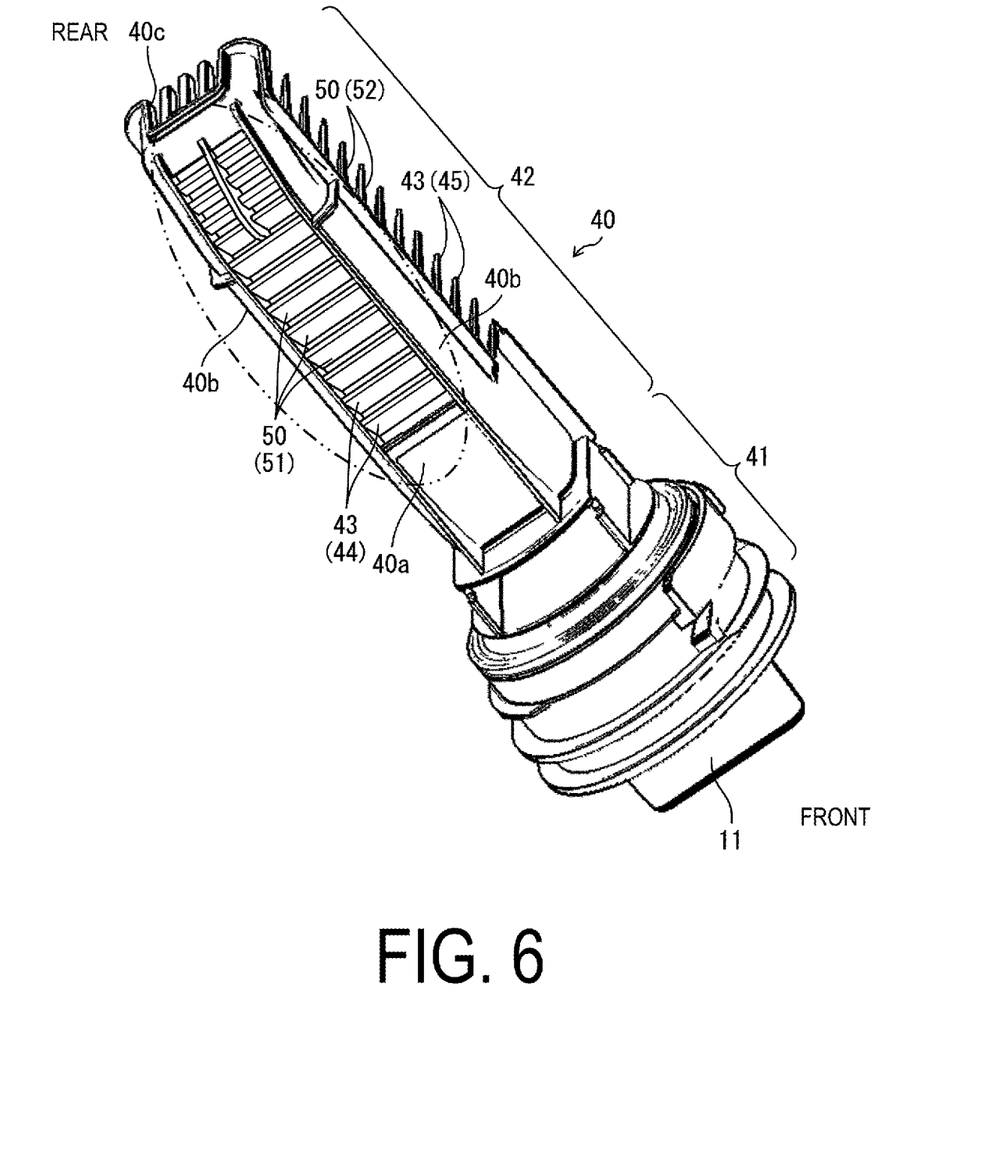
FIG. 6 is a perspective view illustrating a specific configuration of a filter member of the filter device illustrated in FIG. 2 when viewed obliquely from below.
Figure 7:
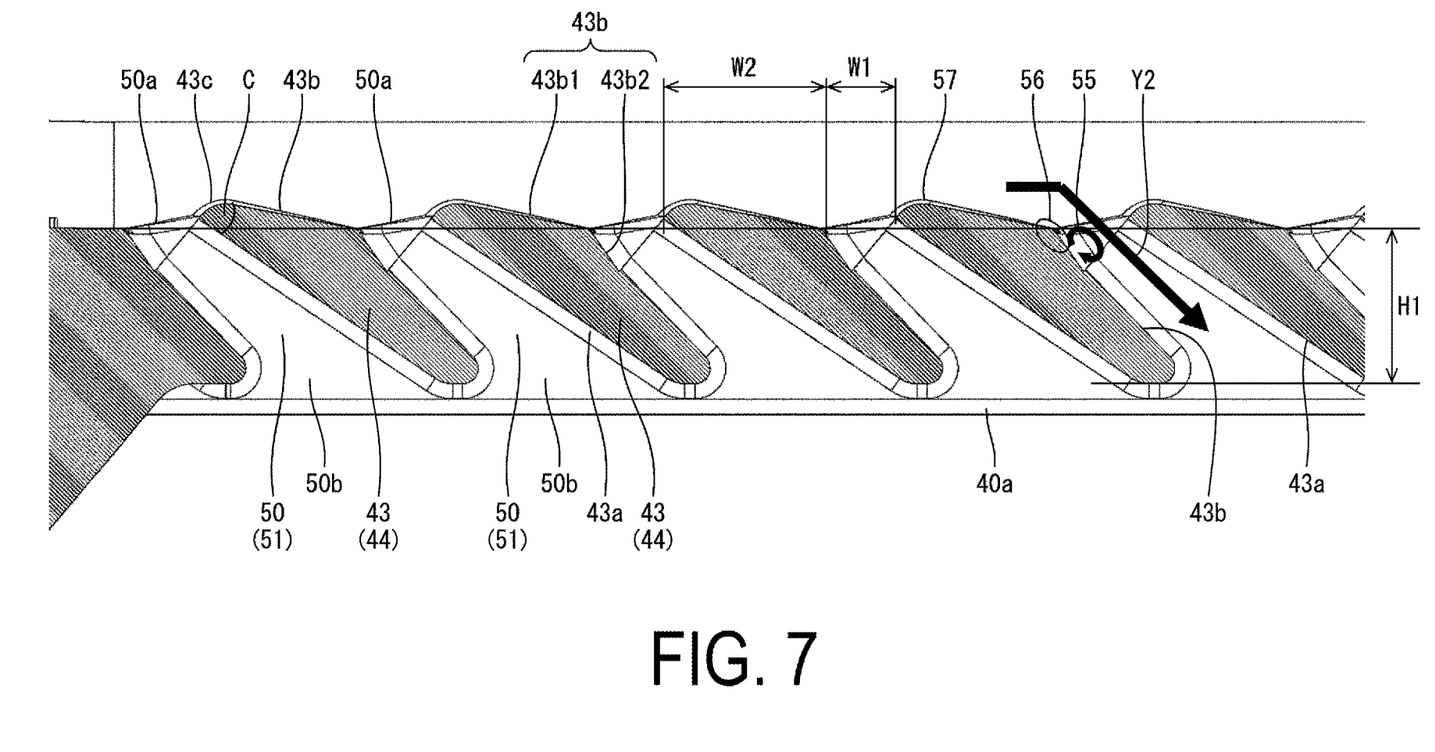
FIG. 7 is an enlarged view of a region B1 illustrated in FIG. 4.
Figure 8:
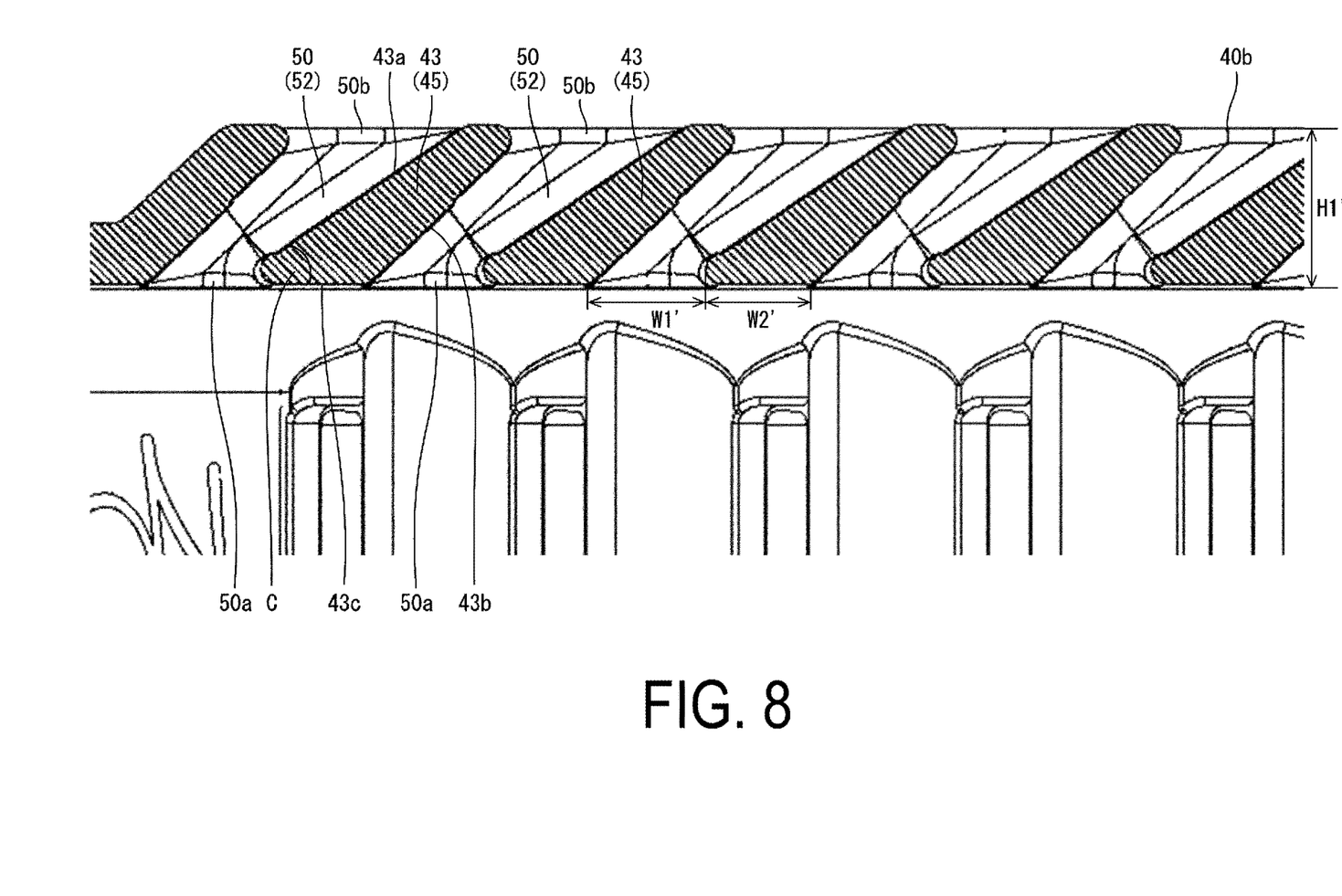
FIG. 8 is an enlarged view of a region illustrated in FIG. 5.

A configuration of the filter member 40 according to the present embodiment will be described. FIG. 4 is a vertical cross-sectional view illustrating the internal configuration of the filter device 20. Note that the filter device 20 is cut at different positions in FIGS. 3 and 4. FIG. 5 is a transverse cross-sectional view illustrating the internal configuration of the filter device 20. FIG. 6 is a perspective view illustrating a specific configuration of the filter member 40 of the filter device 20 when viewed obliquely from below. FIG. 7 is an enlarged view of a region B1 illustrated in FIG. 4. FIG. 8 is an enlarged view of a region B2 illustrated in FIG. 5.

As illustrated in FIGS. 4 to 6, the filter member 40 includes a base portion 41 to which the above-described knob member 11 is attached and a filter portion 42 extending rearward from the base portion 41. The filter portion 42 has a box shape with one open side. The filter member 40 is mounted inside the filter case 30 so that the open side of the filter portion 42 faces upward.

The filter member 40 has a shape extending from an upstream portion proximate to the inflow port 32 toward a downstream portion proximate to the outflow ports 33 and 34. The washing water that has flowed into the filter member 40 through the inflow port 32 flows from one end to another end in the longitudinal direction of the filter member 40. Hereinafter, a flow from the one end to the other end in the longitudinal direction of the filter member 40 will be referred to as a main water stream. The upstream portion can be referred as an upstream side of the flow of the main water stream.

The filter portion 42 of the filter member 40 is provided with a plurality of through holes 50. Each through hole 50 is a hole extending through the filter member 40 from the inner peripheral surface to the outer peripheral surface thereof. The adjacent through holes 50 and 50 are partitioned by a rib-shaped portion 43. That is, the filter member 40 includes the rib-shaped portions 43 each partitioning adjacent through holes 50 and 50.

In the present embodiment, the filter member 40 includes a bottom portion 40a, left and right side portions 40b, and a rear portion 40c. The rib-shaped portions 43 and the through holes 50 are formed at each of the bottom portion 40a and the left and right side portions 40b.

Specifically, a plurality of bottom through holes 51 as the plurality of through holes 50 are arranged at the bottom portion 40a side by side in the longitudinal direction of the filter member 40. A bottom rib-shaped portion 44 as the rib-shaped portion 43 is located between the adjacent bottom through holes 51 and 51. The bottom rib-shaped portions 44 extend in the left-right direction, that is, in the width direction orthogonal to the longitudinal direction of the filter member 40 and are arranged side by side in the longitudinal direction of the filter member 40.

A plurality of side through holes 52 are formed as the plurality of through holes 50 in each of the left and right side portions 40b and are arranged side by side in the longitudinal direction of the filter member 40. A side rib-shaped portion 45 as the rib-shaped portion 43 is located between the adjacent side through holes 52 and 52. The side rib-shaped portions 45 extend in the up-down direction, that is, in the height direction orthogonal to the longitudinal direction of the filter member 40 and are arranged side by side in the longitudinal direction of the filter member 40.

The plurality of bottom through holes 51 and the plurality of side through holes 52, which are the plurality of through holes 50, are provided to be inclined from the inner peripheral surface of the filter member 40. The inner peripheral surface of the filter member 40 is an inner surface of the filter portion 42 having a box shape with one open side. A surface opposite to the inner peripheral surface is defined as an outer peripheral surface of the filter member 40. Thus, the inner peripheral surface of the bottom portion 40*a* corresponds to the upper surface of the bottom portion 40*a*, and the outer peripheral surface of the bottom portion 40*a* corresponds to the lower surface of the bottom portion 40*a*.

The plurality of bottom through holes 51 are inclined in the same direction, and the plurality of side through holes 52 are also inclined in the same direction. In other words, the plurality of bottom rib-shaped portions 44 are inclined in the same direction, and the plurality of side rib-shaped portions 45 are also inclined in the same direction.

Hereinafter, when there is no need to distinguish between the plurality of bottom through holes 51 and the plurality of side through holes 52, these holes are collectively referred to as the plurality of through holes 50. Similarly, when there is no need to distinguish between the plurality of bottom rib-shaped portions 44 and the plurality of side rib-shaped portions 45, these portions are collectively referred to as the plurality of rib-shaped portions 43.

As illustrated in FIGS. 7 and 8, each through hole 50 includes an inflow portion 50*a* through which the washing water flows in and an outflow portion 50*b* through which the washing water flows out. The inflow portion 50*a* is located on the inner peripheral surface of the filter member 40, and the outflow portion 50*b* is located on the outer peripheral surface of the filter member 40. In the present embodiment, the outflow portion 50*b* is formed so as to be located at a downstream portion more than the inflow portion 50*a* in the filter case 30, the downstream portion being a portion where the outflow ports 33 and 34 (see FIG. 2) are located. That is, the through hole 50 is inclined in the flow direction of the main water stream described above.

Each rib-shaped portion 43 includes an upstream surface 43*a* facing the upstream portion, a downstream surface 43*b* facing the downstream portion, and a top surface 43*c* located on the inner peripheral surface of the filter member 40. Since the rib-shaped portion 43 is also inclined in the flow direction of the main water stream described above, a corner portion C at which the top surface 43*c* and the upstream surface 43*a* of the rib-shaped portion 43 intersect has an acute angle.

Description of Effects

Figure 9:
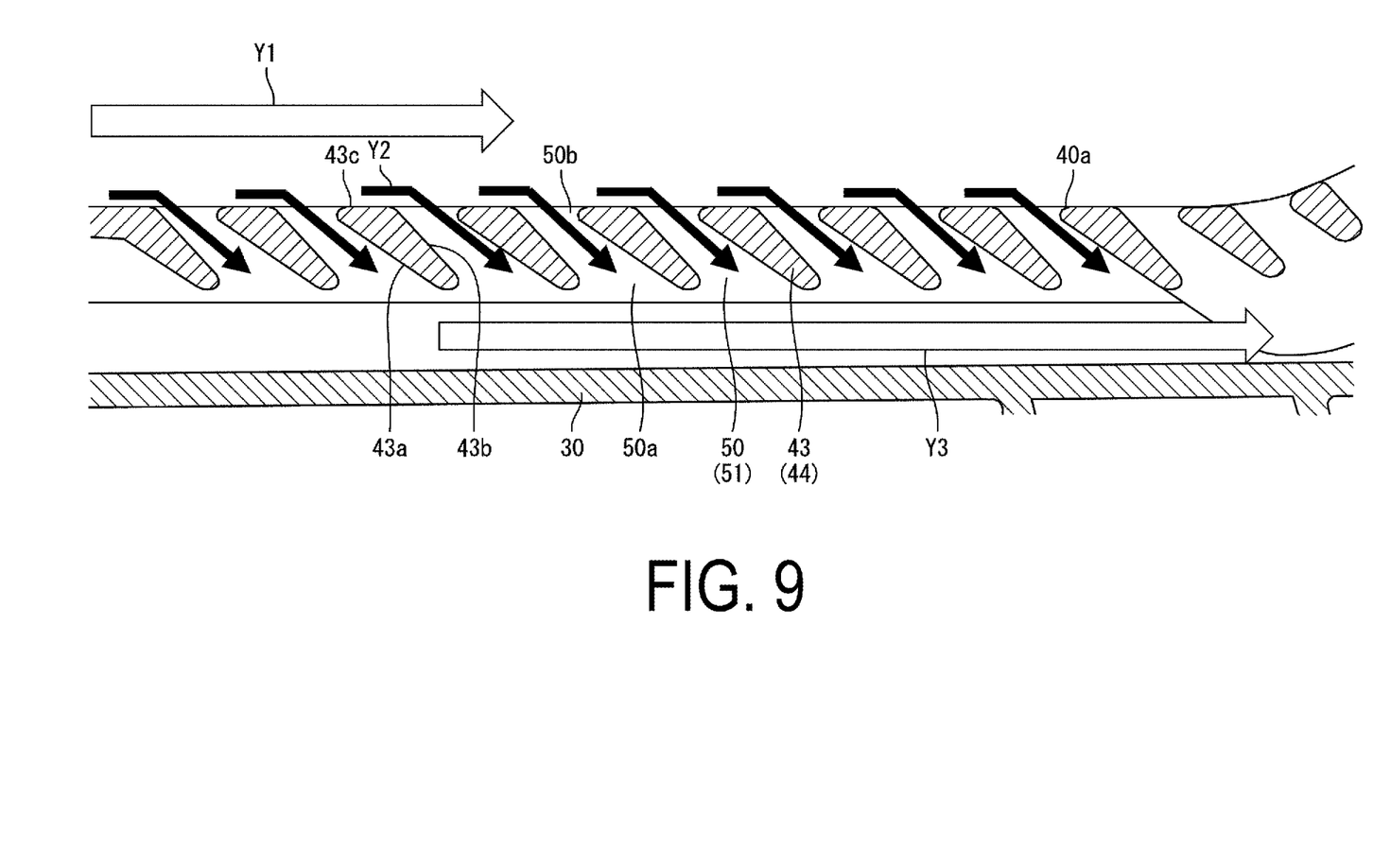
FIG. 9 is a view for describing a flow of washing water flowing into the filter member illustrated in FIG. 6.

FIG. 9 is a view for describing a flow of the washing water flowing into the filter member 40. In FIG. 9, an arrow Y1 indicates a flow of the main water stream flowing in from the inflow port 32 (see FIG. 2) of the filter case 30. Arrows Y2 indicate flows of the washing water passing through the bottom through holes 51. An arrow Y3 indicates a flow of the main water stream passing through the bottom through holes 51 and directed toward the outflow ports 33 and 34 (see FIG. 2) through the lower portion of the filter case 30.

As illustrated in FIG. 9, the washing water that has flowed into the filter case 30 flows on the upper surface of the bottom portion 40*a* in the downstream direction (Y1), passes through the plurality of bottom through holes 51 (Y2) during that time, and flows out through the lower portion of the filter case 30 (Y3).

Figure 10:
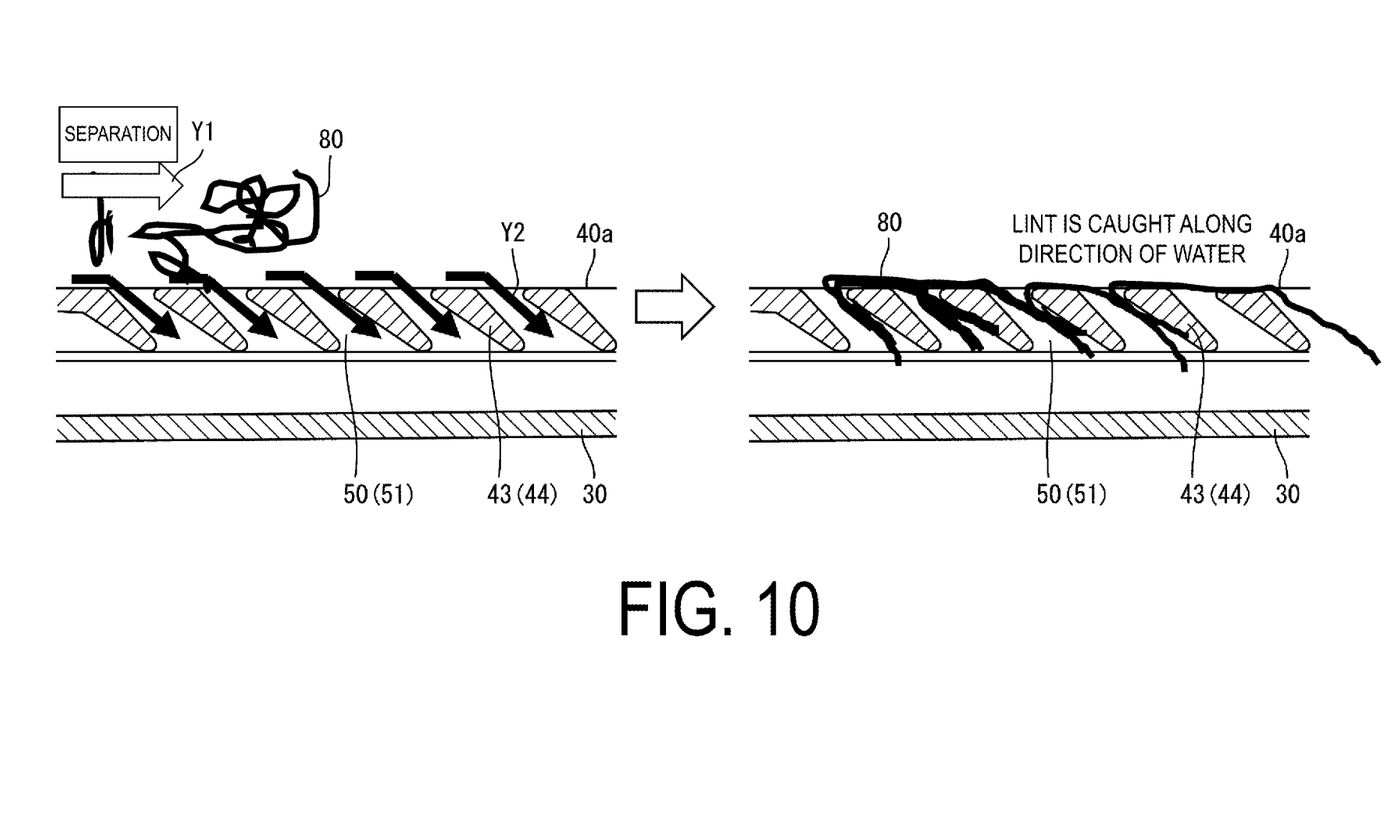
FIG. 10 is a view for describing a step of separating and capturing lint or the like by the filter member illustrated in FIG. 6.

FIG. 10 is a view for describing a step of separating and capturing lint or the like by the filter member 40. As illustrated in FIG. 10, when the main water stream flows into the bottom through holes 51, the lint or the like 80 contained in the main water stream is caught and captured by the bottom rib-shaped portions 44. The lint is caught along the flow direction of the main water stream and captured in a state in which orientations thereof are aligned. In each bottom rib-shaped portion 44, since the corner portion C at which the top surface 43*c* and the upstream surface 43*a* intersect has an acute angle, the lint or the like 80 can be more effectively entangled than when the corner portion C has an obtuse angle or a right angle.

Figure 11:
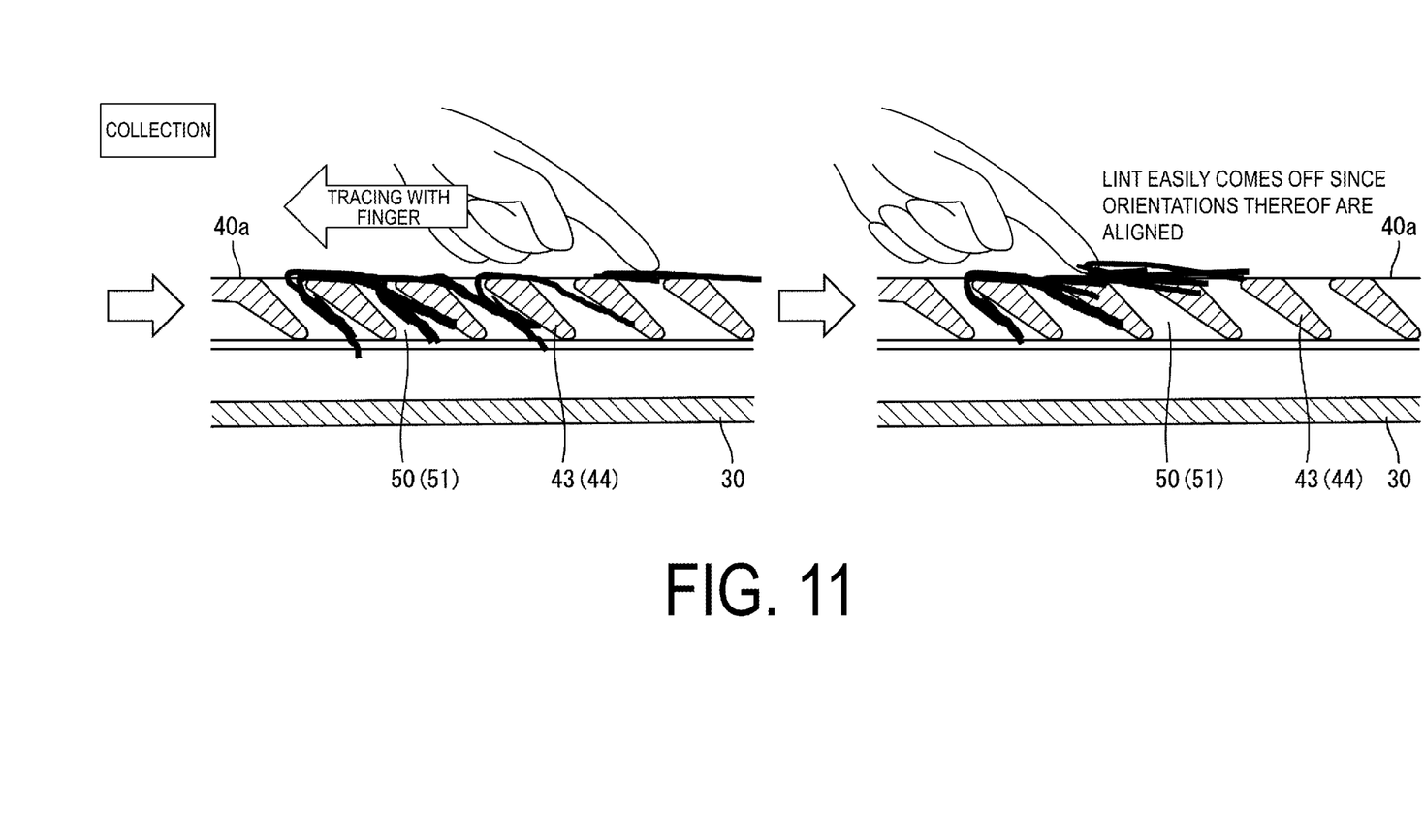
FIG. 11 is a view for describing a step of collecting the lint or the like captured by the filter member illustrated in FIG. 6.

FIG. 11 is a view for describing a step of collecting the lint or the like captured by the filter member 40. As illustrated in FIG. 11, the captured lint or the like 80 is collected by tracing the bottom portion 40*a* of the filter member 40 with a finger or the like in the direction opposite to the flow direction of the main water stream. The lint or the like 80 is captured in a state where orientations thereof are aligned and thus can be easily collected by tracing in one direction. The direction of tracing during the collection is a direction in which the lint or the like 80 is pulled out along the inclinations of the bottom through holes 51.

Figure 12:
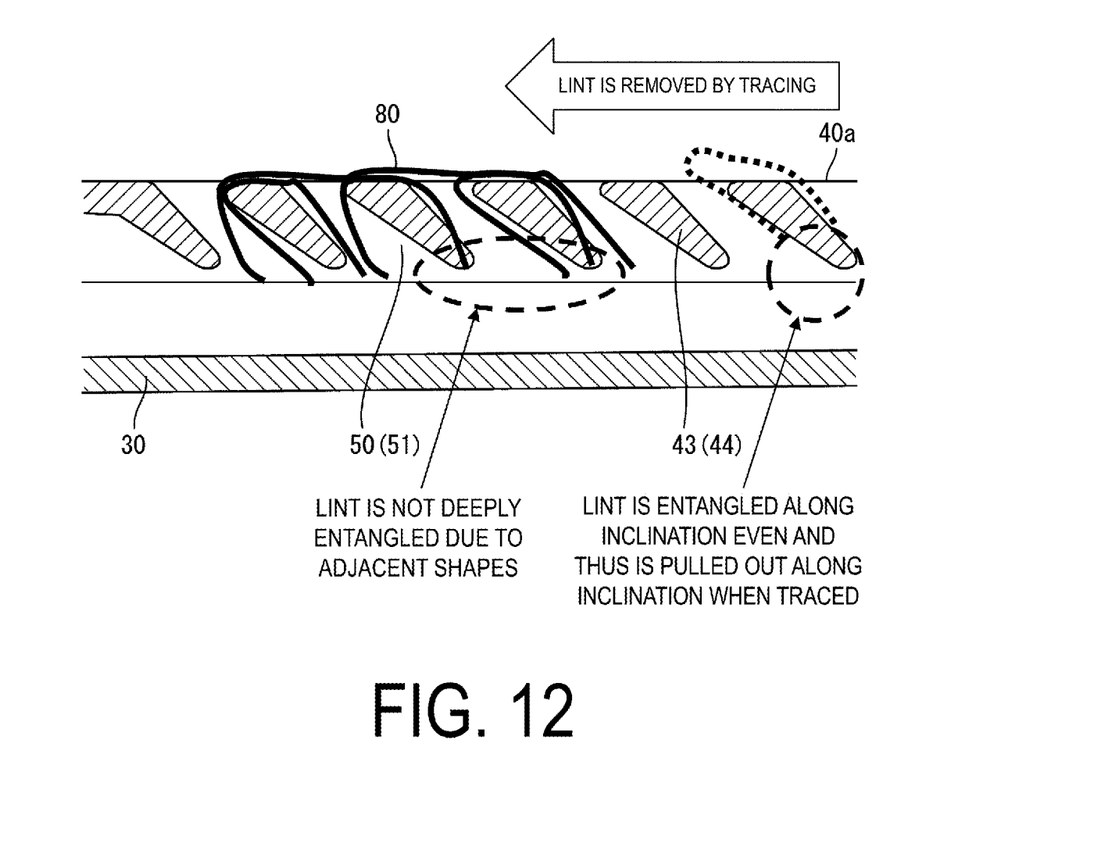
FIG. 12 is a view illustrating a state in which the lint or the like is captured in the filter member illustrated in FIG. 6.
Figure 13:
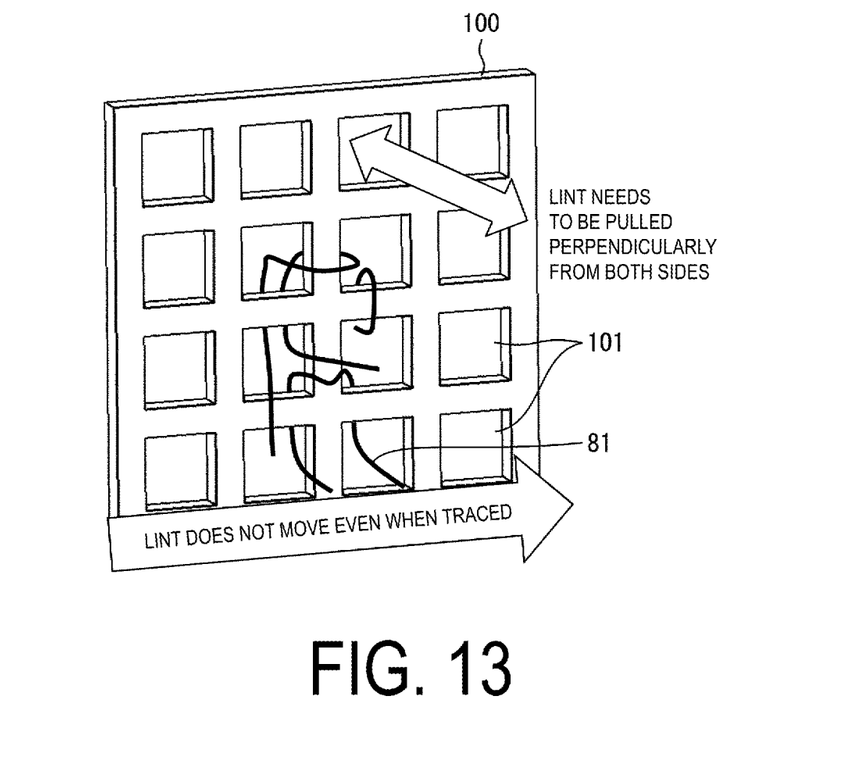
FIG. 13 is a view illustrating a state in which lint or the like is captured by a related-art filter member including a plurality of rectangular through holes.

FIG. 12 is a view illustrating a state in which the lint or the like 80 is captured in the filter member 40. FIG. 13 is a view illustrating a state in which lint or the like 80 is captured by a related-art filter member 100 including a plurality of rectangular through holes 101. As illustrated in FIG. 12, in the filter member 40, the bottom through holes 51 are adjacent to each other in the flow direction of the main water stream. Thus, even when the lint or the like 80 is long, it is unlikely that the lint or the like 80 reaches the lower surface of the bottom portion 40*a* and is wound around each bottom rib-shaped portion 44, and the lint or the like 80 is caught across the plurality of bottom rib-shaped portions 44. In addition, even when entangled with the bottom rib-shaped portions 44, the lint or the like 80 is captured along the inclinations of the bottom rib-shaped portions 44 and thus easily pulled out from the bottom through holes 51 along the inclinations by tracing.

On the other hand, as illustrated in FIG. 13, in the case of the related-art filter member 100 in which the plurality of rectangular through holes 101 are arranged side by side in a lattice pattern in the front-rear direction and in the left-right direction, when the lint or the like 80 is long, the lint or the like 80 is captured in a state of being entangled with the plurality of rectangular through holes 101 located in the upper, lower, left and right directions. Thus, it is impossible to collect the lint or the like 80 only by tracing in one direction, and entanglement needs to be loosened and removed by being pulled from both sides of the filter member 100.

Although the effect has been described with reference to FIG. 9, it is obvious that the side through holes 52 and the side rib-shaped portions 45 have the same effect as the bottom through holes 51 and the bottom rib-shaped portions 44.

Additional Configurations

Furthermore, in the present embodiment, the filter member further has the following configurations 1) to 8).

Configuration 1) As illustrated in FIGS. 5 and 7, in each bottom through hole 51, the outflow portion 50*b* is covered and hidden by the corresponding bottom rib-shaped portion 44 in a plan view seen from the upper surface of the bottom portion 40*a*. That is, the filter member 40 is formed such that the inflow portion 50*a* and the outflow portion 50*b* of the same bottom through hole 51 do not overlap each other in a plan view seen from the upper surface of the bottom portion 40*a*.

The above-described configuration enables the bottom through hole 51 to have a sufficient depth and the lint or the like to be effectively captured. In addition, the outflow portion 50b of the bottom through hole 51 cannot be seen in a plan view seen from the upper surface of the bottom portion 40a, which can cause the user to feel that the capturing effect is excellent.

Although details will not be described for the sake of convenience, as illustrated in FIG. 8, the outflow portion 50b of each side through hole 52 is covered and hidden by the corresponding side rib-shaped portion 45 in a plan view seen from the inner peripheral surface of each side portion 40b, and the same effect is achieved.

Configuration 2) As to each bottom through hole 51, when the thickness of the bottom portion 40a is denoted as a thickness H1 and the width of the inflow portion 50a between the adjacent bottom rib-shaped portions 44 and 44 is denoted as a width W1, the thickness H1 is larger than the width W1 as illustrated in FIG. 7. That is, the bottom through hole 51 of the filter member 40 is formed such that the width W1 of the inflow portion 50a is smaller than the thickness H1 of the bottom portion 40a.

The depth of the bottom through hole 51 depends on the thickness of the bottom portion 40a. According to the above-described configuration, the bottom through holes 51 can have a sufficient depth, and even when the lint or the like 80 is long and is easily entangled, the lint or the like 80 can be effectively avoided from being wound around and entangled with the bottom rib-shaped portions 44 and can be captured in an easily collectible state.

Although details will not be described for the sake of convenience, as illustrated in FIG. 8, each side through hole 52 is formed such that a width W1' of the inflow portion 50a is smaller than a thickness H1' of the side portion 40b, and the same effect is achieved.

Configuration 3) As to each bottom through hole 51, when the width of the inflow portion 50a is denoted as the width W1 and the width of each bottom rib-shaped portion 44 between the adjacent inflow portions 50a and 50a is denoted as a width W2, the width W2 is larger than the width W1 as illustrated in FIG. 7. That is, the bottom through hole 51 of the filter member 40 is formed such that the width W1 of the inflow portion 50a is smaller than the width W2 of the bottom rib-shaped portion 44.

According to the above-described configuration, a decrease in the width W1 of the inflow portion 50a can increase the number of bottom through holes 51 disposed in the flow direction of the main water stream flowing into the filter member 40. This can increase the rate of openings in the bottom portion 40a and improve both the rate of capturing and the water drain property.

Although details will not be described for the sake of convenience, each side through hole 52 may be formed such that the width W1' of the inflow portion 50a is smaller than a width W2' of each side rib-shaped portion 45, and, in this case, the same effect is achieved.

Configuration 4) In each bottom through hole 51, the opening area of the outflow portion 50b is larger than the opening area of the inflow portion 50a as illustrated in FIG. 7. That is, in the filter member 40, the bottom through hole 51 is formed such that the size of the hole increases from the upper surface of the bottom portion 40a toward the lower surface of the bottom portion 40a.

According to the above-described configuration, since the bottom through hole 51 widens toward the lower surface of the bottom portion 40a, the flow velocity of the flow indicated by an arrow Y2, which branches off from the main water stream flowing on the upper surface of the bottom portion 40a and flows into the bottom through hole 51, is higher on the downstream surface 43b located in the flow direction of the main water stream than on the upstream surface 43a located on the opposite side. Thus, a vortex 55 is formed at or near the inflow portion 50a of the bottom through hole 51. The formation of the vortex makes it difficult for the lint or the like 80 to flow into the bottom through hole 51. As a result, it is possible to suppress passing of the lint or the like 80 through the bottom through hole 51 and improve the rate of capturing.

Although details will not be described for the sake of convenience, as illustrated in FIG. 8, each side through hole 52 is also formed such that the size of the hole increases from the inner peripheral surface of the side portion 40b toward the outer peripheral surface of the side portion 40b, and the same effect is achieved.

Configuration 5) As illustrated in FIG. 7, in each bottom through hole 51, the downstream surface 43b includes a first surface 43b1 inclined at a first angle and a second surface 43b2 provided closer to the outflow portion 50b than the first surface 43b1, the second surface 43b2 forming an obtuse angle with the first surface 43b1. A corner portion having an obtuse angle formed by the first surface 43b1 and the second surface 43b2 forms a bent shape 56.

In other words, the filter member 40 has the bent shape 56 protruding in the flow direction of the main water stream at a portion including the downstream surface 43b of the bottom rib-shaped portion 44 or at a portion including the downstream surface 43b and the top surface 43c intersecting the downstream surface 43b.

According to the above-described configuration, the flow indicated by the arrow Y2, which branches off from the main water stream flowing on the upper surface of the bottom portion can be drawn into the bottom through hole 51 at a high flow velocity at the bent shape 56. As a result, a larger vortex 55 can be formed, and the rate of capturing can be further improved.

Although details will not be described for the sake of convenience, a bent shape 56 may be formed on the downstream surface 43b of each side through hole 52. In this case, the same effect is achieved.

Configuration 6) Further, in this case, as illustrated in FIG. 7, the first surface 43b1 may be provided so as to be exposed in a plan view seen from the upper surface of the bottom portion 40a. In other words, the top surface 43c and the first surface 43b1 of the bottom rib-shaped portion 44 may be provided to form an obtuse angle and have a curved surface shape 57 protruding upward.

According to the above-described configuration, the bottom rib-shaped portion 44 has the curved surface shape 57 protruding upward on the upper surface of the bottom portion and thus, when the lint or the like 80 is collected by tracing, a force more easily acts in the pressing direction than when the upper surface of the bottom rib-shaped portion 44 is formed flat. As a result, the lint or the like 80 can be collected by tracing more easily.

Although details will not be described for the sake of convenience, each side rib-shaped portion 45 may also be provided such that the top surface 43c and the first surface 43b1 of the side rib-shaped portion 45 form an obtuse angle and have a curved surface shape 57 protruding inward. In this case, the same effect is achieved.

Configuration 7) As illustrated in FIGS. 3 to 5, in the filter member 40, a curved surface portion 40d extending upward from the bottom portion 40a is formed upstream of the region where the bottom through holes 51 are formed.

According to the above-described configuration, the inflow water hits the curved surface portion 40d and thus the washing water flowing in from the inflow port 32 can be smoothly guided to the regions where the plurality of through holes 50 are formed. Further, when collected by tracing, the lint or the like 80 can be smoothly taken out by using the curved surface portion 40d.

Configuration 8) Further, as illustrated in FIGS. 3 and 5, an indication portion 58 indicating the direction for removing the lint or the like 80, which is a captured substance, is formed at the curved surface portion 40d. Since the curved surface portion 40d is at a position traced at the time of collecting the lint or the like 80, providing the indication portion 58 at this position makes it noticeable, and the user can intuitively recognize the tracing direction and perform the collecting operation. The position at which the indication portion 58 is provided is not limited to the position of the curved surface portion 40d. The indication portion 58 may be formed by any method such as stamping, printing, or sealing.

All of Configurations 1) to 8) described above may be provided at the same time or may be selectively provided in a range of possible combinations. In addition, in the present embodiment, the plurality of through holes 50 are inclined in the direction in which the main water stream flows. However, by providing the plurality of through holes 50 so as to be inclined at least in the same direction, the lint or the like 80 captured by the rib-shaped portion 43 can be collected by tracing.

According to the above-described configuration, the washing water can be drained in a state where a foreign substance such as the lint or the like 80 is effectively removed from the washing water. Such an effect also contributes to achievement of, for example, Goal 6 "Ensure availability and sustainable management of water and sanitation for all" of the sustainable development goals (SDGs) proposed by the UN.

Supplement

A filter member according to the disclosure is a filter member detachably mounted in a filter case formed with an inflow port through which water flows in and an outflow port through which the water flows out, the filter member including a rib-shaped portion configured to partition through holes adjacent to each other, wherein each of the through holes is inclined from an inner peripheral surface of the filter member. With such a configuration, the captured lint or the like can be easily collected. Such a filter member may be provided in the washing machine.

For example, the filter member may have a shape extending from an upstream portion proximate to the inflow port toward a downstream portion proximate to the outflow port, and each of the through holes may include an inflow portion through which the water flows in and an outflow portion through which the water flows out, the outflow portion being formed closer to the downstream portion than the inflow portion.

In addition, for example, the through holes may include a bottom through hole provided at a bottom portion of the filter member, and the outflow portion of the bottom through hole may be covered with and hidden by the rib-shaped portion in a plan view seen from an upper surface of the bottom portion.

Further, for example, a thickness of the bottom portion may be larger than a width of the inflow portion between a plurality of the rib-shaped portions adjacent to each other. A width of the inflow portion may be larger than a width of the rib-shaped portion between the inflow portions adjacent to each other. In each of the through holes, an opening area of the outflow portion may be larger than an opening area of the inflow portion.

Further, for example, the rib-shaped portion may include an upstream surface facing the upstream portion and a downstream surface facing the downstream portion, and the downstream surface may include a first surface inclined at a first angle and a second surface provided closer to the outflow portion than the first surface, the second surface forming an obtuse angle with the first surface. Here, the first surface may be exposed in a plan view seen from the upper surface of the bottom portion.

In addition, for example, a curved surface portion extending upward from the bottom portion may be formed at the upstream portion further than a region in which the bottom through hole is formed. Further, an indication portion indicating a direction for removing a captured substance is formed at the curved surface portion.

Note that the disclosure includes a technical idea focusing on a structure of a gill raker of a gill of a manta. In other words, the disclosure relates to biomimetics.

The disclosure is not limited to each of the above-described embodiments. It is possible to make various modifications within the scope of the claims. An embodiment obtained by appropriately combining technical elements disclosed in different embodiments falls also within the technical scope of the disclosure. Further, technical elements disclosed in the respective embodiments may be combined to provide a new technical feature.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A filter member detachably mounted in a filter case, the filter case being formed with an inflow port through which water flows in and an outflow port through which the water flows out, the filter member comprising:
   a filter portion which has a box shape with one open side;
   a plurality of through holes with which the filter portion is provided; and
   a rib-shaped portion which is configured to partition through holes, among the plurality of through holes, that are adjacent to each other in a longitudinal direction of the filter portion,
   wherein the one open side of the filter portion coincides with an up direction of the filter portion, which is orthogonal to the longitudinal direction of the filter portion,
   each of the plurality of through holes extends through the filter portion from an inner peripheral surface of the filter portion to an outer peripheral surface of the filter portion,
   one side of a longitudinal direction of the filter member is an upstream side of a flow direction of water flowing on the inner peripheral surface, and another side of the longitudinal direction of the filter member is a downstream side of the flow direction of the water flowing on the inner peripheral surface,
   at least one of the through holes includes an inflow portion which is located on the inner peripheral surface and through which the water flows in and an outflow portion through which the water flows out, and the at least one of the through holes is inclined, such that the outflow portion is located further on the other side of the longitudinal direction of the filter member than is the inflow portion.

2. The filter member according to claim 1, wherein the filter member has a shape extending from an upstream portion proximate to the inflow port toward a downstream portion proximate to the outflow port, and the outflow portion is formed closer to the downstream portion than to the inflow portion.

3. The filter member according to claim 2, wherein the plurality of through holes includes a bottom through hole provided at a bottom portion of the filter member, and the outflow portion of the bottom through hole is covered with and hidden by the rib-shaped portion in a plan view viewed from an upper surface of the bottom portion.

4. The filter member according to claim 3, wherein a thickness of the bottom portion is larger than a width of the inflow portion provided between the rib-shaped portion and another rib-shaped portion adjacent to the rib-shaped portion.

5. The filter member according to claim 4, wherein the width of the inflow portion is smaller than a width of the rib-shaped portion between the inflow portion and another inflow portion adjacent to the inflow portion.

6. The filter member according to claim 3, wherein the rib-shaped portion includes an upstream surface facing the upstream portion and a downstream surface facing the downstream portion, and the downstream surface includes a first surface inclined at a first angle and a second surface provided closer to the outflow portion than the first surface, the second surface forming an obtuse angle with the first surface.

7. The filter member according to claim 6, wherein the first surface is exposed in the plan view viewed-seen from the upper surface of the bottom portion.

8. The filter member according to claim 3, further comprising:
a curved surface portion extending upward from the bottom portion at the upstream portion located further upstream from a region where the bottom through hole is formed.

9. The filter member according to claim 8, further comprising:
an indication portion configured to indicate a direction for removing a captured substance, the indication portion being formed at the curved surface portion.

10. The filter member according to claim 1, wherein in the at least one of the through holes, an opening area of the outflow portion is larger than an opening area of the inflow portion.

11. A washing machine comprising the filter member according to claim 1.

* * * * *